United States Patent Office 3,549,560
Patented Dec. 22, 1970

3,549,560
ELECTRICALLY CONDUCTING AMINE-GRAPHITE OXIDE PRODUCT
Harold G. Monsimer, Parsippany, N.J., assignor to Pennwalt Corporation, East Orange, N.J., a corporation of Pennsylvania
Filed Aug. 9, 1968, Ser. No. 751,518
Int. Cl. H01b 1/00
U.S. Cl. 252—500                                 10 Claims

ABSTRACT OF THE DISCLOSURE

Electrically conducting amine-graphite oxide products are made by heating a graphite oxide-amine salt between about 70° C. and about 200° C. until the resistivity of the product is less than about $10^5$ ohm cm.

A graphite oxide-ethylene diamine salt heated at 100° C. for 6 hours has a resistivity of $10^5$ ohm cm.; heated for 24 hours, $\rho$ is about 90 ohm cm.; at 48 hours, $\rho$ is 39 ohm cm.

The Figures

BACKGROUND OF THE INVENTION

(1) Field of the invention

Figure 1:
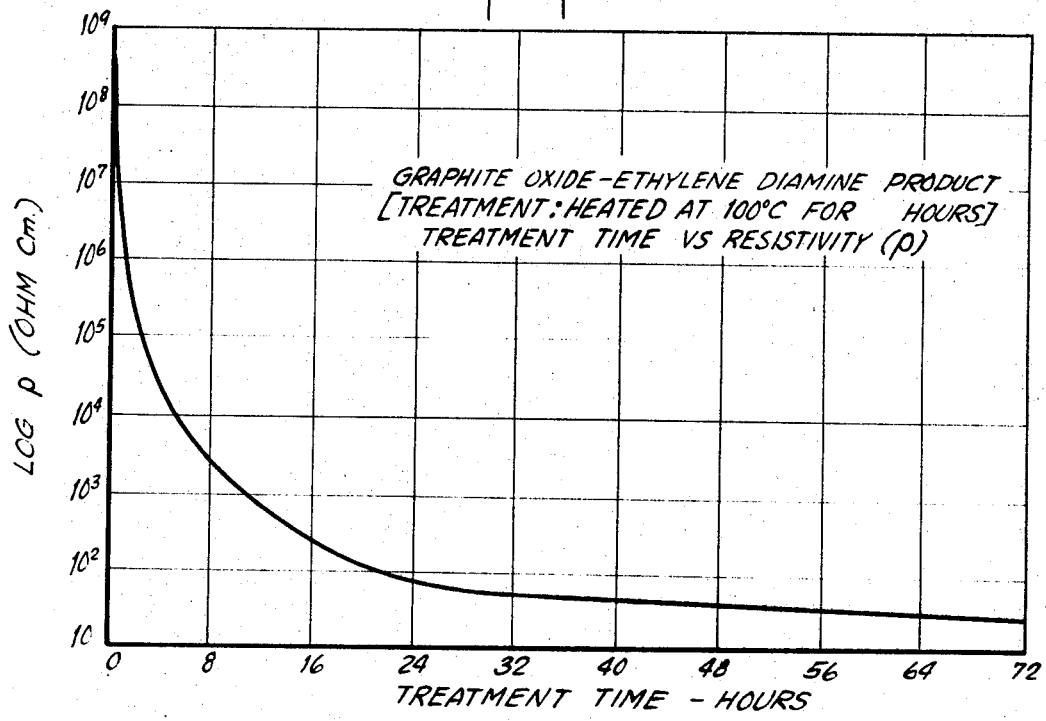
FIG. 1 shows the change of resistivity with change in composition brought on by heat.

This invention relates to compositions derived from a salt (complex) of graphite oxide and an amine. More particularly, the invention relates to such electrically conducting compositions.

(2) Description of the prior art

The terms "graphite oxide and and graphitic acid" are used interchangeably in the art; they generally describe the product of exhaustive oxidation of graphite with strong oxidizing agents, such as perchlorate and permanganate, and are so used herein. The graphite oxide used to prepare the compounds of this invention was prepared by the procedure of Hummers (U.S. Pat. No. 2,798,878). Another procedure is that of Staudenmaier, Berichte der deutsch. Chem. Gesell., 31, 1481–87 (1899).

Graphite oxide, or graphitic acid, is known to form materials, which are commonly described as salts, with basic materials. J. Cano-Ruiz and D. M. C. MacEwan [Tercera Reunion Internacional Sobre Reactividad de los Solids (Madrid) Abril (1956) page 227; and Nature 176, 1222 (1955)] prepared a number of amine salts and made an X-ray study of these materials. D. H. Laren [U.S. 3,084,172 (1963) and U.S. 3,294,702 (1966] prepared a number of alkyl ammonium salts of graphite oxide. A. H. Caster, S. de V. Moulds and H. L. Riley [J. Chem. Soc., 1305 (1937)] used graphite oxide to oxidize aromatic amines. Hofmann and Roenig [Z. fuer anorganische und allgemeine Chemie 234, 326 (1937)] reduced graphite oxide with hydrazine. The product obtained contained only small amounts of nitrogen. In addition there are available two good reviews: R. C. Croft, Quarterly Reviews 14, 1 (1960) and B. R. Hennig, Prog. Inorg. Chem. 1, 129 (1959).

SUMMARY OF THE INVENTION

Amine salts of graphite oxide are not electrical conductors, having a resistivity (specific resistance) in excess of $10^6$ ohm centimeter and more usually in excess of $10^8$ ohm cm. [Hereinafter, the word "resistivity" and the Greek letter "$\rho$" (rho) are used interchangeably and have the units of ohm cm.]

It has been discovered that amine salts of graphite oxide become appreciably conductive of electricity, i.e., have a resistivity of less than about $10^5$ ohm cm., more desirably $10^4$ ohm cm., when heated at a temperature between about 70° C. and about 200° C. for a time which is temperature dependent and also "amine" dependent. The composition obtained by the heat treatment is chemically different, having a lower oxygen content and in some cases, a lower nitrogen content, from the amine salt itself. The resistivity continues to decrease as the time of heating, at a given temperature, is continued but does reach an essentially constant value. The essentially constant value differs for each amine salt and also, somewhat, on the temperature of heat treatment. Thus this invention permits the production of many materials each having its own resistivity; the total range of resistivities obtainable is very wide. This range extends in the working examples from $\rho \approx 10^5$ to $\rho \approx 2$.

UTILITY

The compositions of this invention are useful because of their electrical properties. They are particularly useful because a wide range of specific resistances is made available; they find uses as resistances or conductors where size, weight and resistance relationships are important. They are valuable because of the low temperatures at which they are prepared. Also, these materials find use in conductive coatings which can be applied at relatively low temperature, 70° C.–200° C. They are of especial interest in printed micro-circuitry because the finely divided compositions can be "inked" onto the substrate. It has been observed these compositions exhibit some Seebeck effect and are of interest in the direct conversion of heat to electricity.

DESCRIPTION OF THE INVENTION AND EXAMPLES

The compositions of the invention are derived from amine salts (complexes) of graphite oxide. Any amine which reacts with graphite oxide can be used to prepare the amine salt precursor of the composition of the invention.

More desirable amines from the point of availability are the primary and secondary aliphatic hydrocarbon, cycloaliphatic hydrocarbon, aromatic hydrocarbon and heterocyclic compounds which have nitrogen, oxygen, or sulfur as part of the ring. The aforesaid amines may be monoamine, diamines or polyamines.

Also desirable are the heterocyclic amines having at least one nitrogen in the ring.

Aliphatic hydrocarbon includes araliphatic hydrocarbon. The cyclic compounds may be single ring, connected rings or fused rings.

Aliphatic hydrocarbon radicals are illustrated by: alkyl, alkenyl, cycloalkyl, cycloalkenyl, phenalkyl, alkylene, alkenylene, cycloalkylene, cycloalkenylene [two or more "ene" radicals may be present in a given amine.] Typical of these amines are: ethyl and diethylamine; allyl and diallylamine; t-butyl and di-t-butylamine; cyclohexyl and dicyclohexylamine; 1-cyclopentyl-2-aminopropane; 1,1,-3,3-tetramethylbutylamine; dodecyl and didodecylamine; octadecyl and dioctadecylamine; octadecenylamine; ethylenediamine; diaminohexane; diethylenetriamine; octadecenyltrimethylenediamine; triaminopropane; benzylamine; cuminylamine.

Typical aromatic amines are: aniline; phenylenediamine; diphenylamine; phenylmethylamine; amino-toluene; methylenedianiline; diaminotoluene.

Amines joined to a heterocyclic having nitrogen in the ring are illustrated by aminopyridine; aminoquinoline;

diamino-s-triazine; triamino-s-triazine; 4 - aminomethylpiperidene.

Typical heterocyclic amine compounds are: pyridine, pyrrole, pyrazole, 1,2,4-triazole; trimethyleneimine; pyrrolidine; piperidine; 1,3-diazine; 1.4-diazine; s-triazine; pyridoquinoline; phenazine; quinoxaline; 1,3-di-4-piperidylpropane.

The graphite oxide and the amine are reacted, desirably in at least the theoretical amount. Because the graphite oxide is a solid, usually an excess of amine is used in order to obtain maximum reaction. With classes of amines exemplified by the working examples, a 1:1 weight ratio gave excellent results as determined by resistivity. The graphite oxide is best ground to a fine particle size.

The amine salt formation reaction proceeds readily at ambient temperature or at moderate temperatures, i.e., below about 70° C. In the case of liquid amines or lower melting point amines, the graphite oxide and amine may be reacted as is. In some cases, it may be desirable to operate with an inert liquid solvent for the amine.

Usually the excess amine and/or solvent are separated from the solid amine salt before the heat treatment to produce the composition.

The amine salt formation and heat treatment to prepare a composition of the invention can be carried out simultaneously by operating in the defined heat treatment temperature range. This method is of particular interest with high melting point amines and high boiling liquid amines.

The formation of the compositions of the invention is not only temperature-time dependent but also is dependent on the particular amine salt itself. For each amine salt, there is a "minimum" temperature requirement for formation of the composition. For example, the ethylene diamine-graphite oxide salt begins to change to the composition at a significant rate at approximately 90° C. The phenylene diamine-graphite oxide salt begins to change at a significant rate of about 60° C. The allylamine-graphite oxide salt begins to change at a significant rate of about 50° C.

Even the refractory amine salts will give conductive compositions on prolonged heating at about 70° C. A more acceptable time results from the use of a lower temperature of about 90° C.

The compositions can be prepared at the 200° C. temperature which approaches the spontaneous decomposition temperature of graphite oxide. Generally the upper temperature used is below about 170° C.

The temperature range between 90° C. and about 150° C. gives a reasonable time for most amine salts. The working examples illustrate a given profile of time temperature relations on resistivity; it is apparent that other combinations of time and temperature might also produce these compositions.

Preferably, the heat treatment temperature is between about 90° C. and 150° C., and the time of heating such that a product composition has a resistivity below about $10^4$ ohm cm., usually about 2 hours at the minimum transition temperature.

In one embodiment of the invention wherein a coating of the composition is desired to be placed on a suitable substrate, a suspension of the particular amine salt in a suitable inert liquid is used to place a coating of the amine salt on the substrate. The dry coating is electrically non-conductive. By heating the substrate and coating in the aforesaid manner, the amine salt coating is converted to a composition of the invention coating having the electrical conductivity obtainable from that particular salt.

EXAMPLES

Compositions of the invention are illustrated by the following non-limiting working examples.

*Preparation of graphite oxide.*—A solution of 10 gm. of sodium nitrate in 450 mil. of concentrated sulfuric acid was cooled to 5° C. and 20 gm. of graphite added. While cooling was continued 60 gm. potassium permaganate was added slowly over a period of about one hour with stirring. The reaction temperature was slowly raised to 35° C., which was maintained for 75 minutes, when the exothermic reaction subsided. 900 ml. of water was added very slowly so that the reaction temperature did not exceed 90° C. After 15 minutes the reaction was diluted to 2.5 l., 100 ml. of 3% hydrogen peroxide was added and the crude product filtered. The product was washed 3 or 4 times with hot water, dried under vacuum and then over phosphorous pentoxide to yield the graphite oxide that was used to prepare the materials of this invention.

*Procedure for obtaining resistivity.*—Resistances were measured on pellets approximately 13 x 1 mm. which were formed by pressing the powdered sample at 20,000 lb./sq. in. Low ohmic contacts could be obtained by painting the faces of the pellets with "DuPont Silver Preparation #4817°." Some values reported herein were obtained on uncoated pellets, these are noted in the examples. (The error due to "contact resistance" is most sinificant where the resistance is greater or of the same order of magnitude as the resistance of the pellet; i.e., where the resistance is low. For practical purposes this error is important only below $\rho$ values of $10^4$). High resistances, $>10^5$, ohms were measured on a standard vacuum tube volt meter and in general resistance between 0.20 ohms and $15^5$ ohms were measured on a "Model R.C. 16B-2 Industrial Instrument" resistance bridge at 1000 cycles/sec. (Most values reported were obtained at 24±1° C. while some values were obtained at room temperature, 20–27° C.). The specific resistance (or resistivity) was then calculated from the formula $$\rho = \frac{aR}{t}$$

where, R is the observed resistance, $a$ is the area of the face of the pellet and $t$ is the thickness of the pellet.

Example 1

The ethylene diamine salt of graphite oxide was prepared by grinding graphite oxide, to ensure adequate surface area for reaction, with an excess of ethylene diamine—this is desirable to disperse the heat of reaction—filtering the salt and drying the residue under vacuum. When pressed into a pellet at 20,000 p.s.i., this amine salt exhibited a specific resistance of $1.6 \times 10^8$ ohm cm. and had the following analysis: Found (percent): C, 51.97; H, 4.54; N, 14.77.

The above material was heated for 2 hours at 110–115° C. to give product I. The discrete nature of this material, as well as the materials in the following examples, was demonstrated by the disappearance at each step of a peak from the differential thermal analysis curve and by sharp breaks in the rate of decay when followed by resistance measurements. This material had a specific resistance of $1.7 \times 10^5$ ohm cm. (non-coated pellet, room temp.)

*Analysis.*—Found (percent): C, 58.77; H, 4.02; N, 15.18.

Example 2

The product from Example 1 was heated an additional 6 hours at 110–115° C. to give product II which had a specific resistance of 67.9 ohm cm. (pressed pellet).

*Analysis.*—Found (percent): C, 62.73; H, 3.25; N, 15.44.

Example 3

The product from Example 2 was heated for 3 hours at 200° C. to give product III which had a specific resistance of 24 ohm cm. (pressed pellet, coated, room temp.)

*Analysis.*—Found (percent): C, 66.85; H, 2.56; N, 15.38.

Example 4

Graphite oxide was heated with an excess of boiling ethylene diamine, the solid was separated by centrifuging, washed with water and dried at 100° C. to give a product with a specific resistance of $3.3 \times 10^1$ ohm cm. (pressed pellet, non-coated, room temp.).

Example 5

The product from Example 4 was washed several times with dilute hydrochloric acid, water and dried at 100° C. to give a product which had a specific resistance of 3.9 ohm cm. (pressed pellet, non-coated room temp.)
Found (percent): C, 70.43; H, 1.57; N, 6.68.

Example 6 (Utility)

Slurry prepared by grinding graphite oxide with ethylene diamine was applied as a coating to various substrates including glass, tin, polyvinyl dichloride, Delrin, and paper. When these coatings were heated above 100° C., they became conductive.

Example 7

The pyridine salt of graphite oxide was prepared by the procedure given in Example 1, $\rho \geq 10^7$ ohm cm. (pressed pellet, non-coated room temp.). This salt was heated at 150–160° C. for 30 minutes to yield a product with a specific resistance of $\approx 10^4$ ohm cm. (pressed pellet, non-coated, room temp.).

Example 8

The piperidine salt of graphite oxide was prepared by the procedure given in Example 1, $\rho \geq 10^7$ ohm cm. (pressed pellet non-coated room temp.). This salt was heated overnight at 150° C. to yield a product with a specific resistance of $\approx 10^3$ ohm cm. (pressed pellet non-coated, room temp.)
Found (percent): C, 70.67; H, 4.64; N, 6.32.

Example 9

The aniline salt of graphite oxide was prepared by the procedure given in Example 1, $\rho \geq 10^7$ ohm cm. (pressed pellet, non-coated, room temp.) This salt was heated overnight at 150° C. to yield a product with a specific resistance of $\approx 10^4$ ohm cm. (pressed pellet, non-coated, room temp.)
Found (percent): C, 73.86; H, 2.46; N, 5.97.

Example 10

The t-butylamine salt of graphite oxide was prepared by the procedure of Example 1, $\rho \geq 10^8$ cm. This salt was heated overnight at 150° C. to give product with a specific resistance of $\approx 10^4$ ohm cm. (pressed pellet, non-coated, room temp.)
*Analysis.*—Found (percent): C, 67.11; H, 3.95; N, 5.26.

Example 11

The allylamine salt of graphite oxide was prepared by the procedure given in Example 1, $\rho$ $1.4 \times 10^{10}$ ohm cm. (pressed pellet).
Found (percent): C, 56.93; H, 4.58; N, 6.52.
Table I shows the effect of heating this salt at various temperatures. A sample was heated overnight at 155° C. to yield a product with a specific resistance of 9.0 ohm cm. (pressed pellet).
Found (percent): C, 68.28; H, 2.90; N, 6.74.

Example 12

The diethylenetriamine salt of graphite oxide was prepared by the procedure given in Example 1, $\rho$ $7.8 \times 10^8$.
Found (percent): C, 46.91; H, 6.53; N, 14.36.
Table I shows the effect of heating this salt at various temperatures. A sample was heated overnight at 155° C. to yield a product with a specific resistance of 8.5 ohm cm.
Found (percent): C, 62.37; H, 3.51; N, 13.93.

Example 13

A mixture of 27 gm. of o-phenylenediamine and 6 gm. of graphite oxide in 500 ml. of ether was stirred for 6 hours, allowed to stand overnight, filtered and dried to give 8 gm. of the o-phenylenediamine salt, $\rho$ $1.3 \times 10^8$ ohm cm.
Found (percent): C, 49.53; H, 2.99; N, 1.83.
Table I shows the effect of heating this material at various temperatures. A sample was heated overnight at 150° C. to yield a product with a specific resistance of 3.4 ohm cm.
Found (percent): C, 64.53; H, 1.88; N, 2.37.

Example 14

A mixture of 1.8 gm. of graphite oxide and 2 gm. of s-triazine in 50 ml. of benzene was stirred 2 days, filtered and dried under vacuum to yield 3.2 gm. of the s-triazine salt, $\rho$ $2.8 \times 10^8$ ohm cm.
Found (percent): C, 48.05; H, 2.27; N, 5.31.
Table I shows the effect of heating this salt at various temperatures. A sample that was heated at 150° C. for 2 hours had a specific resistance less than 3.6 ohm cm.
Found (percent): C, 62.04; H, 1.17; N, 5.48.

Example 15

A mixture of 3 gm. of graphite oxide and 15 ml. of a 50% aqueous solution of cyclotrimethylenetriamine was allowed to stand for 4 days, centrifuged and dried to yield the cyclotrimethylenetriamine salt, $\rho$ $1.5 \times 10^{10}$ ohm cm.
Found (percent): C, 41.27; H, 5.39; N, 22.40.
Table I shows the effect of heating this salt at various temperatures. A sample was heated overnight at 155° C. to yield a product with a specific resistance of 15.4 ohm cm.
Found (percent): C, 54.68; H, 2.66; N, 11.71.

TABLE I.—SPECIFIC RESISTANCE OF HEATED SALT IN OHM CM.

| Example | Salt | Heated 2 hours at ° C. | | | |
|---|---|---|---|---|---|
| | | 75–80 | 100–105 | 120–125 | 150–5 |
| 11 | $1.4 \times 10^{10}$ | $2.0 \times 10^8$ | $1.6 \times 10^6$ | $6.9 \times 10^2$ | 17.5 |
| 12 | $7.8 \times 10^8$ | $9.0 \times 10^8$ | $4.9 \times 10^4$ | 65.3 | 22.7 |
| 13 | $1.3 \times 10^8$ | $3.5 \times 10^5$ | $3.2 \times 10^3$ | 71 | 17 |
| 14 | $2.8 \times 10^8$ | $4.3 \times 10^8$ | $2.5 \times 10^3$ | 84.7 | <3.6 |
| 15 | $1.5 \times 10^{10}$ | $1.5 \times 10^{10}$ | $2 \times 10^8$ | $8.4 \times 10^5$ | 70.6 |

Example 16

An ethylenediamine-graphite oxide salt prepared as in Example 1 was heated at 100° C. for 72 hours. Samples were withdrawn periodically and the resistivity was measured. These data are shown in FIG. 1 which is a smoothed curve drawn through the values obtained, plotted against time.

Example 17

Figure 2:
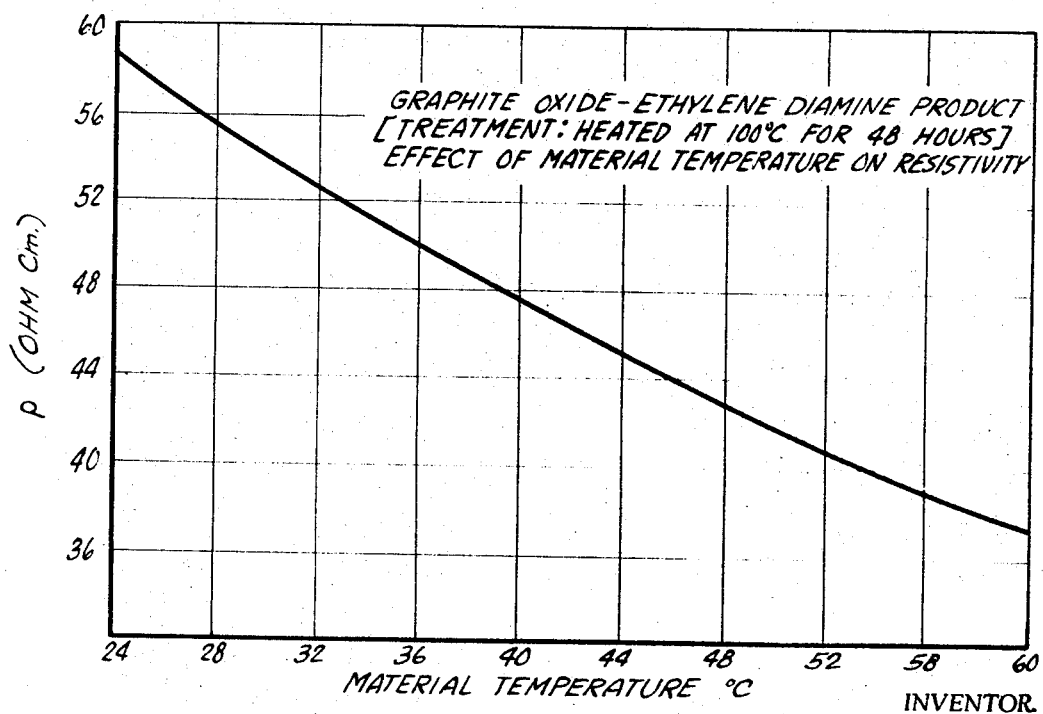
FIG. 2 shows the resistivity with change of temperature without change of composition.

The relationship between resistivity of the composition and temperature was determined for a composition of Example 17 (48 hours heating) which showed little change in composition with further elevated temperature heating. The results are shown in FIG. 2. [It has been observed that each composition has its own temperature resistivity relationship.]

Example 18 (Stability)

The stability of the resistance of these materials were demonstrated in two ways. (1) Certain pellets were stored for 8 months at room temperature (15–30° C.). (2) Other samples were heated at 50–60° for 5 days. Within the range of the reproducibility of the readings, the resistance of materials that had been obtained by heating the salt were unchanged. The results of this study are set out in Table II.

TABLE II.—STABILITY OF GRAPHITE OXIDE AMINE COMPLEXES

| Sample | Treatment | ρ before | ρ after |
|---|---|---|---|
| Ethylenediamine unheated | 8 months at 15–30° C | $1.7 \times 10^8$ | $2.9 \times 10^7$ |
| Ethylenediamine 110° C. 8 hrs | do | 67.9 | 83.6 |
| Ethylenediamine unheated | 50–60°, 5 days | $1.0 \times 10^8$ | $7.3 \times 10^4$ |
| Ethylenediamine 100° 2 hrs | do | $3.2 \times 10^5$ | $1.3 \times 10^5$ |
| Ethylenediamine 100° 8 hrs | do | $3.6 \times 10^3$ | $3.2 \times 10^3$ |
| Ethylenediamine 100° 24 hrs | do | 81.1 | 80.4 |
| Allylamine unheated | do | $5.1 \times 10^8$ | $5.1 \times 10^7$ |
| Allylamine 155° 18 hrs | do | 11.3 | 11.3 |
| Diethylenetriamine unheated | do | $7.8 \times 10^8$ | $2.4 \times 10^7$ |
| Diethylenetriamine 125° 2 hrs | do | 77.4 | 69.7 |
| o-Phenylenediamine unheated | do | $1.3 \times 10^6$ | $1.8 \times 10^4$ |
| o-Phenylenediamine 155° 18 hrs | do | 25.5 | 25.0 |
| s-Triazine unheated | do | $2.3 \times 10^8$ | $>10^9$ |
| s-Triazine 130° 2 hrs | do | $1.3 \times 10^3$ | $1.1 \times 10^3$ |
| Cyclotrimethylenetriamine unheated | do | $1.5 \times 10^9$ | $2.4 \times 10^8$ |
| Cyclotrimethylenetriamine 155° 2 hrs | do | 49 | 49 |

What is claimed is:

1. An amine-graphite oxide composition obtained by heating an amine salt of graphite oxide, which salt is not an electrical conductor, at a temperature between about 70° C. and about 200° C. for at least the time necessary to produce an amine-graphite oxide composition which is a conductor of electricity as evidenced by a resistivity below about $10^5$ ohm cm. at about 25° C.

2. The composition of claim 1 wherein the amine salt of graphite oxide is the reaction product of graphite oxide and an amine selected from the class consisting of (a) aliphatic hydrocarbon, cycloaliphatic hydrocarbon, aromatic hydrocarbon, and heterocyclic having N, O, or S in the ring, said amines being primary or secondary, and (b) heterocyclic having at least one amine N in the ring.

3. The composition of claim 1 wherein said temperature is between about 90° C. and about 150° C. and said time is at least about 2 hours and is adjusted to produce a product having a resistivity below about $10^4$ ohm cm.

4. The composition of claim 1 wherein said amine is ethylene diamine.

5. The composition of claim 1 wherein said amine is pyridine.

6. The composition of claim 1 wherein said amine is piperidine.

7. The composition of claim 1 wherein said amine is allylamine.

8. The composition of claim 1 wherein said amine is s-triazine.

9. The composition obtained by (a) grinding graphite oxide with excess ethylene diamine, filtering the solid amine salt, and removing the ethylene diamine and (b) heating the solid amine salt at 100° C. for 6 hours to obtain a product having a resistivity of about $10^4$ ohm cm.

10. The composition obtained by (a) reacting a stirred mixture of about 2 gm. of graphite oxide and about 2 gm. of s-triazine in 50 ml. of benzene for about 48 hours, filtering off the solid amine salt and removing the benzene; and (b) heating the amine salt for about 2 hours at about 150° C. to obtain a product having a resistivity of less than about 3.6 ohm cm.

References Cited

UNITED STATES PATENTS

| 3,084,172 | 4/1963 | Larsen | 252—316 |
| 3,294,702 | 12/1966 | Larsen | 252—316 |

DOUGLAS J. DRUMMOND, Primary Examiner

U.S. Cl. X.R.

106—307, 308; 260—248, 293, 290, 583